United States Patent
Gregoris et al.

[11] Patent Number: 6,074,224
[45] Date of Patent: Jun. 13, 2000

[54] HIGH VOLTAGE ELECTRICAL COUPLING HAVING OUTER ELASTIC PROTECTIVE SLEEVE

[75] Inventors: Jean-Luc Gregoris, Montereau; Lino Zen, Cannes-Ecluses, both of France

[73] Assignee: SAT - Societe Anonyme de Telecommunications, Paris, France

[21] Appl. No.: 09/068,879

[22] PCT Filed: Nov. 19, 1996

[86] PCT No.: PCT/FR96/01826

§ 371 Date: May 18, 1998

§ 102(e) Date: May 18, 1998

[87] PCT Pub. No.: WO97/19495

PCT Pub. Date: May 29, 1997

[30] Foreign Application Priority Data

Nov. 21, 1995 [FR] France ................................. 95 13778

[51] Int. Cl.[7] ................................................. H01R 4/66
[52] U.S. Cl. ................................................. 439/99; 439/921
[58] Field of Search ............................. 439/98, 99, 88, 439/578, 921, 934

[56] References Cited

U.S. PATENT DOCUMENTS

| | | | |
|---|---|---|---|
| 4,427,256 | 1/1984 | Reif et al. | 439/584 |
| 5,230,640 | 7/1993 | Tardif | 439/578 |
| 5,655,921 | 8/1997 | Makal et al. | 439/206 |

FOREIGN PATENT DOCUMENTS

| | | |
|---|---|---|
| 0683556 | 11/1995 | European Pat. Off. . |
| 3508329 | 9/1986 | Germany . |
| 9103144 | 6/1991 | Germany . |

*Primary Examiner*—Steven L. Stephan
*Assistant Examiner*—Barry M. L. Standig
*Attorney, Agent, or Firm*—Griffin, Butler, Whisenhunt & Szipl, LLP

[57] ABSTRACT

An electrical coupling part comprising a conductive coupling member, an inner conductive layer surrounding the coupling member, an insulating layer surrounding the conductive layer, and an elastic protective sleeve which comprises at least one cylindrical portion adjacent to an end of the insulating layer and a conical portion adjacent to the cylindrical portion, the protective sleeve further comprising, at an end remote from the cylindrical portion, an orifice of greater diameter than the cylindrical portion.

2 Claims, 1 Drawing Sheet

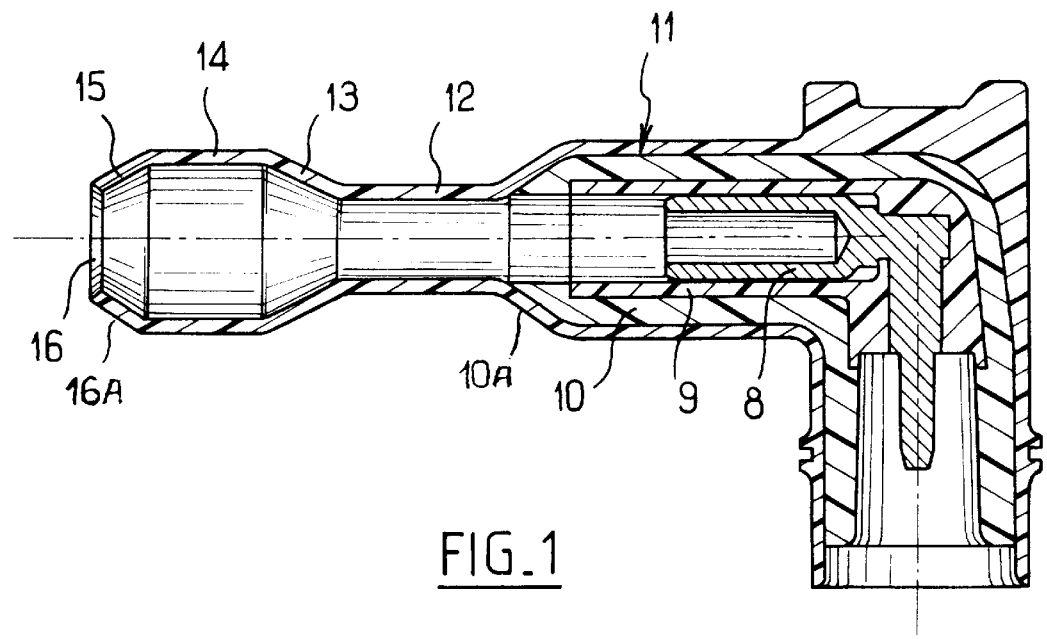
FIG_1
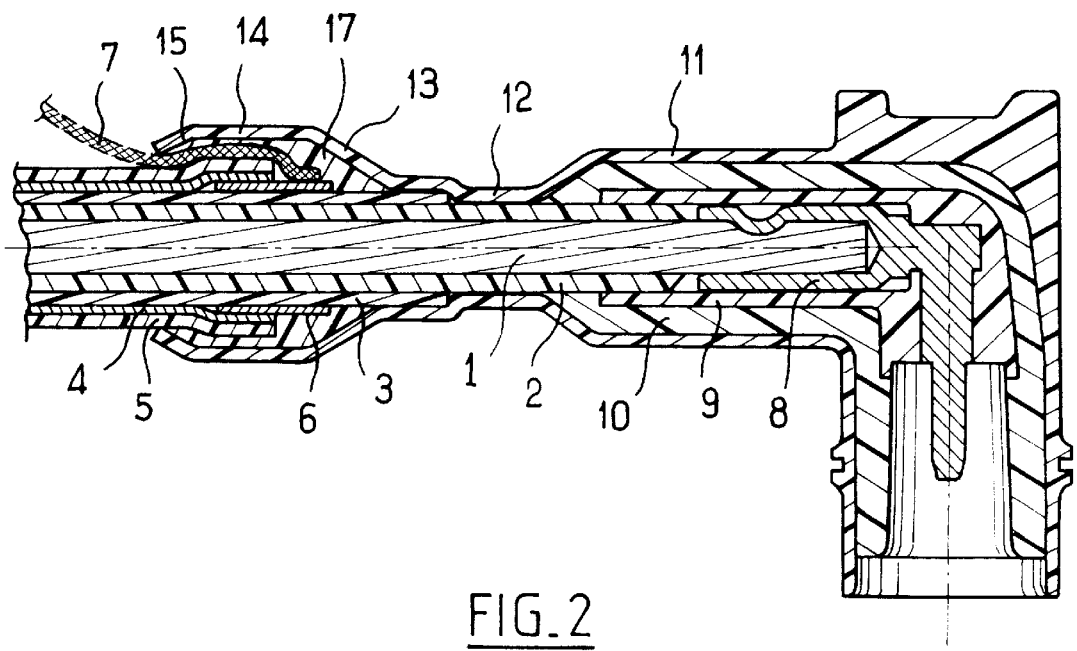
FIG_2

HIGH VOLTAGE ELECTRICAL COUPLING HAVING OUTER ELASTIC PROTECTIVE SLEEVE

The present invention relates to an electrical coupling part including a protective sleeve for coming into contact with an end of a semiconductive screen of an electric cable.

BACKGROUND OF THE INVENTION

It is known that medium and high voltage electric cables generally comprise a conductive core covered in an insulating layer, itself covered in a semiconductive screen in contact with metal shielding that is connected to ground and covered by an outer layer.

It is also known that when an electric cable is being connected to another electric cable or to a piece of equipment, or when an end of an electric cable is being made ready, it is necessary to strip the conductive core of the cable, and generally to cut the semiconductive screen back from the end of the insulating layer so as to avoid an electric arc forming between the conductive core which is taken to a high voltage and the semiconductive screen which is at ground potential.

In order to avoid dielectric stress appearing at the end of the semiconductive screen, it is then necessary to place a protective sleeve on the junction or on the end of the cable so as to come into contact with the end of the semiconductive screen, which protective sleeve includes a layer of material that is conductive, semiconductive, or stress-reducing.

The end of the semiconductive screen constitutes a step relative to the insulating layer of the cable, and the simplest solution for putting the conductive or semiconductive layer of the protective sleeve into connection with the end of the semiconductive screen consists in pressing the end of the sleeve against the end of the semiconductive screen. Nevertheless, whether at a cable junction or at a cable end, the protective sleeve is generally associated with other elements which are positioned relative to the end of the conductive core or the end of the insulating layer of the cable so that the protective sleeve can be brought into end-on contact with the semiconductive screen only on the condition of cutting away the semiconductive screen at a distance that is very accurate relative to the end of the conductive core or of the insulating layer, and that is difficult to achieve on site. In addition, pressing the end of the protective sleeve against the end of the semiconductive screen of the cable does not enable good sealing to be obtained between the coupling part and the cable.

In order to ensure a connection between the protective sleeve and the end of the semiconductive screen, it is therefore usual to provide for the protective sleeve to cover the end of the semiconductive screen over a distance that is several times the thickness of the semiconductive screen. To ensure good contact between the protective sleeve and the semiconductive screen of the cable, it is desirable for the protective sleeve to be made out of an elastic material having a diameter at rest that is slightly smaller than the outside diameter of the semiconductive screen of the cable.

Nevertheless, as mentioned above, the end of the semiconductive screen forms a step relative to the insulating layer, such that the end of the protective sleeve tends to come into abutment against said step while it is being put into place. To go past the step, it has been envisaged that a conical piece can be placed on the cable before the coupling part is put into place.

Nevertheless, that additional operation is a source of difficulty on a worksite.

OBJECTS AND SUMMARY OF THE INVENTION

The invention provides an electrical coupling part comprising a conductive coupling member, an inner conductive layer surrounding the coupling member, an insulating layer surrounding the conductive layer, and an elastic protective sleeve which, at rest, comprises at least one cylindrical portion adjacent to an end of the insulating layer and a conical portion adjacent to the cylindrical portion and flaring away from the cylindrical portion, the protective sleeve further comprising, at an end remote from the cylindrical portion, an orifice of greater diameter than the cylindrical portion.

Thus, when the coupling part is put into place on an electric cable whose semiconductive layer is of a diameter that is slightly greater than the diameter of the cylindrical portion of the protective sleeve, the largest diameter of the orifice of the protective sleeve enables it to be engaged on the cable, and the conical portion of the protective sleeve serves as a ramp for enabling the cylindrical portion of the protective sleeve to be elastically engaged on the semiconductive screen of the cable when the coupling part is pushed axially to be engaged on the end of the cable.

In an advantageous version of the invention, the sleeve includes a conical portion adjacent to the orifice and of a diameter that tapers towards the orifice. Thus, when the coupling part has been put into place, the elasticity of the conical portion adjacent to the orifice of the protective sleeve serves to clamp the end of the protective sleeve on the cable, and thus provides good sealing for the connection with the coupling part.

BRIEF DESCRIPTION OF THE DRAWING

Other characteristics and advantages of the invention will appear on reading the following description of a particular non-limiting embodiment of the invention, described with reference to the accompanying figures, in which:

FIG. 1 is an axial section view of a coupling part of the invention including a sleeve, prior to being put into place, that is at rest; and FIG. 2 is an axial section view of the FIG. 1 coupling part after it has been put into place on a cable.

MORE DETAILED DESCRIPTION

With reference to the figures, the coupling part of the invention is designed to be put into place on an electric cable which comprises in conventional manner a conductive core 1 covered in an insulating layer 2 which is cut off while the cable is being prepared from a point set back from the end of the conductive core 1 so as to leave said end bare, a semiconductive screen 3 which covers the insulating layer 2 and which is cut off from a point that is set back from the end of the insulating layer 2, and metal shielding 4 together with an outer layer 5 which are cut off at a point set back from the end of the semiconductive screen 3. The semiconductive screen 3 and the metal shield 4 are grounded by a metal ring 6 which is slid beneath the end of the metal shielding 4 and which is connected to a metal braid 7 suitably connected to ground potential in a manner that is not shown.

The electrical coupling part shown is constituted by a pluggable socket made in a prefabricated manner as a one-piece molding and includes a conductive coupling member 8 designed to be crimped on the end of the conductive core of the cable, an internal conductive layer 9 which surrounds the coupling member and is designed to cover the end of the insulating layer 2 of the cable, being in contact therewith, an insulating layer 10 which covers the conductive inner layer 9, and an elastic protective sleeve given overall reference 11 which is constituted as a single layer of conductive or semiconductive rubber. The protective sleeve 11 covers the insulating layer 10 and extends beyond it.

According to the invention, the portion of the protective sleeve 11 which extends beyond the insulating layer 10 includes, at rest, that is before being put into place on an electric cable, cylindrical portion 12 adjacent to the end 10A of the insulating layer 10, a conical portion 13 adjacent to the cylindrical portion 12 and flaring away from the cylindrical portion 12 towards the free end of the protective sleeve 11, a cylindrical portion 14 connected to the larger diameter end of the conical portion 13, and a conical portion 15 tapering towards an orifice 16 at an end 16A that is remote from the cylindrical portion 12. In the rest position as shown in FIG. 1, the diameter of the cylindrical portion 12 is slightly smaller than the diameter of the semiconductive screen 3 of the cable on which the coupling part is to be mounted, and said diameter is preferably very slightly smaller than the diameter of the insulating layer 2 of the cable. Also, the diameter of the orifice 16 is greater than the diameter of the cylindrical portion 12 and preferably slightly greater than the diameter of the semiconductive screen 3 of the cable on which the coupling part is to be mounted.

Before the coupling part of the invention is put into place, the end of the metal shield 4 and of the outer layer 5, together with the apparent end of the metal ring 6 and the immediately adjacent portion of the semiconductive screen 3 are covered in a sealing cement 17, itself covered by a tape wound around the sealing cement 17 to hold it in place while the coupling part is being put into place. The tape is not shown in the figure.

In addition, grease is preferably placed inside the protective sleeve 11 and on the outer surface of the insulating layer 2 of the cable.

When the coupling part is put onto the cable, the orifice 16 of the protective sleeve is easily engaged on the end of the cable, and the grease facilitates displacement of the sleeve over the insulating layer 2 until the conical portion 13 comes to bear against the end of the semiconductive screen 3. The conical portion 30 13 then serves as a ramp bearing against the end of the semiconductive screen 3, causing the cylindrical portion 12 to expand, thus bringing it into close contact with the end of the semiconductive screen 3 while the conical portion 13 comes to bear against the tape surrounding the sealing cement 17, with the grease filling the space between the end of the semiconductive screen and the inner face of the cylindrical portion 12 of the protective sleeve. The cylindrical portion 14 and the conical portion 15 also bear against the cement 17. In FIG. 2, it will be observed that the conical portion 15 tapering towards the end orifice 16 serves to hold the protective sleeve in place over the sealing cement 17 so that the cement is firmly held against the elements it is supposed to seal.

Naturally, the invention is not limited to the embodiment described and variants can be applied thereto without going beyond the ambit of the invention as defined by the claims.

In particular, although the coupling part of the invention is described with a protective sleeve having a cylindrical portion 14 extending between the conical portion 13 and the conical portion 15 to cover the cement 17 over a relatively long length, it is possible to provide a protective sleeve having a conical portion 17 that is directly connected to the conical portion 13 or that is circularly arcuate in section between the cylindrical portion 12 and the orifice 16.

Also, although the invention is described with reference to a coupling part that is in the form of a pluggable socket, the invention also applies to a junction between two cables, in which case the protective sleeve 11 is made symmetrically about a tubular conductive member that is open towards both ends of the protective sleeve 11, each end of the protective sleeve 11 constituting a cantilevered portion having the above-specified characteristics.

We claim:

1. An electrical coupling part comprising a conductive coupling member, an inner conductive layer surrounding the coupling member, an insulating layer surrounding the conductive layer, and an elastic molded protective sleeve, having a configuration at rest before being put into place on an electric cable, the elastic protective sleeve comprises at least one first cylindrical portion adjacent to an end of the insulating layer and a first conical portion adjacent to the first cylindrical portion and having a flare of increasing diameter with a longitudinal distance from the first cylindrical portion, the elastic protective sleeve further comprising, at an end remote from the first cylindrical portion, an orifice having a greater diameter than a diameter of the first cylindrical portion; wherein the coupling member includes a second conical portion adjacent to the orifice and having a flare of decreasing diameter with a longitudinal distance towards the orifice.

2. A coupling part according to claim 1, wherein the elastic protective sleeve includes a second cylindrical portion between the second conical portion adjacent the orifice and the first conical portion adjacent the first cylindrical portion.

* * * * *